US007280967B2

(12) United States Patent
Gleason et al.

(10) Patent No.: US 7,280,967 B2
(45) Date of Patent: Oct. 9, 2007

(54) METHOD FOR DETECTING MISALIGNED PHONETIC UNITS FOR A CONCATENATIVE TEXT-TO-SPEECH VOICE

(75) Inventors: Philip Gleason, Boca Raton, FL (US); Maria E. Smith, Davie, FL (US); Jie Z. Zeng, Miami, FL (US)

(73) Assignee: International Business Machines Corporation, Armonk, NY (US)

( * ) Notice: Subject to any disclaimer, the term of this patent is extended or adjusted under 35 U.S.C. 154(b) by 875 days.

(21) Appl. No.: 10/630,113

(22) Filed: Jul. 30, 2003

(65) Prior Publication Data

US 2005/0027531 A1 Feb. 3, 2005

(51) Int. Cl.
*G10L 13/08* (2006.01)
*G10L 15/00* (2006.01)

(52) U.S. Cl. ...................... 704/260; 704/231; 704/258; 704/255; 704/249

(58) Field of Classification Search ................ 704/260, 704/235, 231, 249, 255–256, 258
See application file for complete search history.

(56) References Cited

U.S. PATENT DOCUMENTS 5,349,687 A * 9/1994 Ehlig et al. ................. 704/231
5,727,125 A * 3/1998 Bergstrom et al. .......... 704/264
5,848,163 A 12/1998 Gopalakrishnan et al.
5,884,267 A * 3/1999 Goldenthal et al. ...... 704/270.1
5,937,384 A * 8/1999 Huang et al. ............... 704/256
6,202,049 B1 * 3/2001 Kibre et al. ................ 704/267
6,529,866 B1 * 3/2003 Cope et al. ................. 704/205
6,665,641 B1 * 12/2003 Coorman et al. ........... 704/260
6,792,407 B2 * 9/2004 Kibre et al. ................ 704/260
7,010,488 B2 * 3/2006 van Santen et al. ........ 704/258

* cited by examiner

*Primary Examiner*—Vijay Chawan
(74) *Attorney, Agent, or Firm*—Akerman Senterfitt

(57) ABSTRACT

A method of filtering phonetic units to be used within a concatenative text-to-speech (CTTS) voice. Initially, a normality threshold can be established. At least one phonetic unit that has been automatically extracted from a speech corpus in order to construct the CTTS voice can be received. An abnormality index can be calculated for the phonetic unit. Then, the abnormality index can be compared to the established normality threshold. If the abnormality index exceeds the normality threshold, the phonetic unit can be marked as a suspect phonetic unit. If the abnormality index does not exceed the normality threshold, the phonetic unit can be marked as a verified phonetic unit. The concatenative text-to-speech voice can be built using the verified phonetic units.

23 Claims, 3 Drawing Sheets

METHOD FOR DETECTING MISALIGNED PHONETIC UNITS FOR A CONCATENATIVE TEXT-TO-SPEECH VOICE

BACKGROUND OF THE INVENTION

1. Technical Field

The present invention relates to the field of synthetic speech and, more particularly, to the detection of misaligned phonetic units for a concatenative text-to-speech voice.

2. Description of the Related Art

Synthetic speech generation via text-to-speech (TTS) applications is a critical facet of any human-computer interface that utilizes speech technology. One predominant technology for generating synthetic speech is a data-driven approach which splices samples of actual human speech together to form a desired TTS output. This splicing technique for generating TTS output can be referred to as a concatenative text-to-speech (CTTS) technique.

CTTS techniques require a set of phonetic units, called a CTTS voice, that can be spliced together to form CTTS output. A phonetic unit can be any defined speech segment, such as a phoneme, an allophone, and/or a sub-phoneme. Each CTTS voice has acoustic characteristics of a particular human speaker from which the CTTS voice was generated. A CTTS application can include multiple CTTS voices to produce different sounding CTTS output.

A large sample of human speech called a CTTS speech corpus can be used to derive the phonetic units that form a CTTS voice. Due to the large quantity of phonetic units involved, automatic methods are typically employed to segment the CTTS speech corpus into a multitude of labeled phonetic units. Each phonetic unit is verified and stored within a phonetic unit data store. A build of the phonetic data store can result in the CTTS voice.

Unfortunately, the automatic extraction methods used to segment the CTTS speech corpus into phonetic units can occasionally result in errors or misaligned phonetic units. A misaligned phonetic unit is a labeled phonetic unit containing significant inaccuracies. Two common misalignments can include the mislabeling of a phonetic unit and improper boundary establishment for a phonetic unit. Mislabeling occurs when the identifier or label associated with a phonetic unit is erroneously assigned. For example, if a phonetic unit for an "M" sound is labeled as a phonetic unit for "N" sound, then the phonetic unit is a mislabeled phonetic unit. Improper boundary establishment occurs when a phonetic unit has not been properly segmented so that its duration, starting point and/or ending point is erroneously determined.

Since a CTTS voice constructed from misaligned phonetic units can result in low quality synthesized speech, it is desirable to exclude misaligned phonetic units from a final CTTS voice build. Unfortunately, manually detecting misaligned units is typically unfeasible due to the time and effort involved in such an undertaking. Conventionally, technicians remove misaligned units when synthesized speech output produced during CTTS voice tests contains errors. That is, the technicians attempt to "test out" misaligned phonetic units, a process that can usually only correct the most grievous errors contained within a CTTS voice build.

SUMMARY OF THE INVENTION

The invention disclosed herein provides a method, a system, and an apparatus for detecting misaligned phonetic units for use within a concatenative text-to-speech (CTTS) voice. In particular, a multitude of phonetic units can be automatically extracted from a speech corpus for purposes of forming a CTTS voice. For each phonetic unit, an abnormality index can be calculated that indicates the likelihood of the phonetic unit being misaligned. The greater the abnormality index, the greater the likelihood of a phonetic unit being misaligned. The abnormality index for the phonetic unit can be compared against an established normality threshold. If the abnormality index is below the normality threshold, the phonetic unit can be marked as a verified phonetic unit. If the abnormality index is above the normality threshold, the phonetic unit can be marked as a suspect phonetic unit. Suspect phonetic units can then be systematically displayed within an alignment verification interface, where each unit can either be verified or rejected. All verified phonetic units can be used to build a CTTS voice.

One aspect of the present invention includes a method of filtering phonetic units to be used within a CTTS voice. Initially, a normality threshold can be established. In one embodiment that includes a multitude of phonetic units, the normality threshold can be adjusted using a normality threshold interface, wherein the normality threshold interface presents a graphical distribution of abnormality indexes for the multitude of phonetic units. For example, a histogram of abnormality indexes can be presented within the normality threshold interface. The abnormality index indicates a likelihood of an associated phonetic unit being misaligned.

Within the method, at least one phonetic unit that has been automatically extracted from a speech corpus in order to construct the CTTS voice can be received. Appreciably, the construction of the CTTS voice can require a multitude of phonetic units that together form the set of phonetic units ultimately contained within the CTTS voice. An abnormality index can be calculated for the phonetic unit. Then, the abnormality index can be compared to the established normality threshold. If the abnormality index exceeds the normality threshold, the phonetic unit can be marked as a suspect phonetic unit. If the abnormality index does not exceed the normality threshold, the phonetic unit can be marked as a verified phonetic unit.

In one embodiment, the calculation of the abnormality index can include examining the phonetic unit for a multitude of abnormality attributes and assigning an abnormality value for each of the abnormality attributes. The abnormality index can be based at least in part upon the abnormality values. In a further embodiment, an abnormality weight can be identified for each abnormality attribute. The abnormality weight and the abnormality value can be multiplied together and the results added to determine the abnormality index. For example, each phonetic unit can be examined for at least one abnormality attribute characteristic. At least one abnormality parameter can be determined for each abnormality attribute characteristic. The abnormality parameters can be utilized within an abnormality attribute evaluation function. The abnormality index can be calculated using the abnormality attribute evaluation functions.

Additionally, the suspect phonetic unit can be presented within an alignment validation interface. The alignment validation interface can include a validation means for validating the suspect phonetic unit and a denial means for invalidating the suspect phonetic unit. If the validation means is selected, the suspect phonetic unit can be marked as a verified phonetic unit. If the denial means is selected, the suspect phonetic unit can be marked as a rejected phonetic unit. All verified phonetic units can be placed in a verified phonetic unit data store, wherein the verified phonetic unit data store can be used to build the CTTS voice. The rejected phonetic units, however, can be excluded from a build of the CTTS voice. In one embodiment, an audio playback control can be provided within the alignment validation interface. Selection of the audio playback control can result in the suspect phonetic unit being audibly presented within the interface. In another embodiment that includes at least a multitude of phonetic units, at least one navigation control can be provided within the alignment validation interface. Selection of the navigation control can result in the navigation from the suspect phonetic unit to a different suspect phonetic unit.

In another aspect of the present invention, a system of filtering phonetic units can be used within a CTTS voice. The system can include a means for establishing a normality threshold. The system can also include a means for receiving at least one phonetic unit that has been automatically extracted from a speech corpus in order to construct a CTTS voice. Additionally, the system can include a means for calculating an abnormality index for the phonetic unit. The abnormality index can indicate a likelihood of the phonetic unit being misaligned. Further, the system can include a means for comparing the abnormality index to the normality threshold. If the abnormality index exceeds the normality threshold, a means for marking the phonetic unit as a suspect phonetic unit can be triggered. If the abnormality index does not exceed the normality threshold, a means for marking the phonetic unit as a verified phonetic unit can be triggered.

BRIEF DESCRIPTION OF THE DRAWINGS

There are shown in the drawings embodiments, which are presently preferred, it being understood, however, that the invention is not limited to the precise arrangements and instrumentalities shown.

DETAILED DESCRIPTION OF THE INVENTION

The invention disclosed herein provides a method, a system, and an apparatus for detecting misaligned phonetic units for use within a concatenative text-to-speech (CTTS) voice. A CTTS voice refers to a collection of phonetic units, such as phonemes, allophones, and sub-phonemes, that can be joined via CTTS technology to produce CTTS output. Since each CTTS voice can require a great multitude of phonetic units, the CTTS phonetic units are often automatically extracted from a CTTS speech corpus containing speech samples. The automatic extraction process, however, often results in misaligned phonetic units that are detected and removed from an unfiltered data store before the CTTS voice is built. The present invention enhances the efficiency with which misaligned phonetic units can be detected.

More particularly, an abnormality index indicating the likelihood of a phonetic unit being misaligned can be calculated. If this abnormality index exceeds a previously established normality threshold value, the phonetic unit is marked as a suspect phonetic unit. Otherwise, the phonetic unit is marked as a verified phonetic unit. Suspect phonetic units can be presented within a graphical user interface (GUI) so that a technician can determine whether the suspect phonetic units should be verified or rejected. Verified phonetic units can be included within a CTTS voice build and rejected phonetic units can be excluded from a CTTS voice build. Consequently, misaligned phonetic units can be detected and filtered using the present solution much more quickly and with greater accuracy compared to conventional misalignment detection methods.

Figure 1:
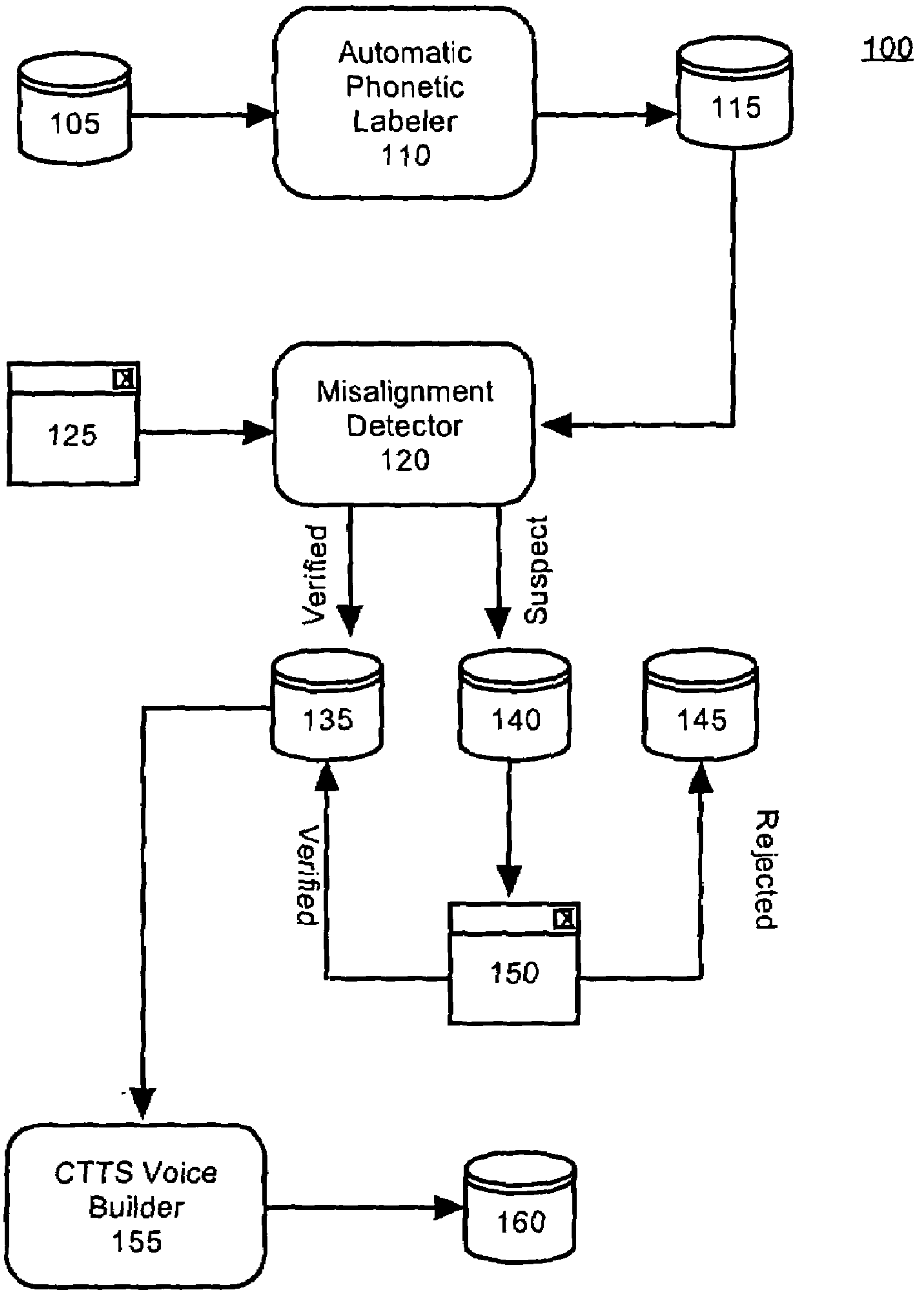
FIG. 1 is a schematic diagram illustrating an exemplary system for detecting misaligned phonetic units in accordance with the inventive arrangements disclosed herein.

FIG. 1 is a schematic diagram illustrating an exemplary system 100 for detecting misaligned phonetic units. The system 100 can include an automatic phonetic labeler 110, a misalignment detector 120, a normality threshold interface 125, an alignment validation interface 150, and a CTTS voice builder 155. A CTTS speech corpus data store 105, an unfiltered data store 115, a verified data store 140, a misaligned data store 145, and a CTTS voice data store 160 can also be provided.

The automatic phonetic labeler 110 can include hardware and/or software components configured to automatically segment speech samples into phonetic units. The automatic phonetic labeler 110 can appropriately label each phonetic unit segment that it creates. For example, a phonetic unit can be labeled as a particular allophone or a phoneme extracted from a particular linguistic context. The linguistic context for a phonetic unit can be determined by phonetic characteristics of neighboring phonetic units.

One of ordinary skill in the art can appreciate that a variety of known speech processing techniques can be used by the automatic phonetic labeler 110. In one embodiment, the automatic phonetic labeler 110 can detect silences between words within a speech sample to initially separate the sample into a plurality of words. Then, the automatic phonetic labeler 110 can use pitch excitations to segment each word into phonetic units. Each phonetic unit can then be matched to a corresponding phonetic unit contained within a repository of model phonetic units. Thereafter, each phonetic unit can be assigned the label associated with the matched model phonetic unit. Further neighboring phonetic units can be appropriately labeled and used to determine the linguistic context of a selected phonetic unit.

Notably, the automatic phonetic labeler 110 is not limited to a particular methodology and/or technique and any of a variety of known techniques can be used by the automatic phonetic labeler 110. For example, the automatic phonetic labeler can segment speech samples into phonetic units using glottal closure instance (GCI) detection.

The misalignment detector 120 can include hardware and/or software components configured to analyze unfiltered phonetic units to determine the likelihood that each unit contains misalignments. Two common misalignments can include the mislabeling of a phonetic unit and improper boundary establishment for a phonetic unit. The misalignment detector 120 can determine misalignment by detecting abnormalities with each phonetic unit. An abnormality index based at least in part upon the detected abnormalities or lack thereof can be determined. Once an abnormality index has been determined, the misalignment detector 120 can then compare the abnormality index against a predetermined normality threshold. As a result of the comparisons, phonetic units from the unfiltered data store 115 can be selectively placed within either a verified data store 135 or a suspect data store 140.

The normality threshold interface 125 can be a graphical user interface (GUI) that can facilitate the establishment and adjustment of the normality threshold. For example, a distribution graph of abnormality indexes for predetermined phonetic units can be presented within the normality threshold interface 125. A technician can view the distribution graph and determine an appropriate value for the normality threshold.

The alignment validation interface 150 can be a GUI used by technicians to classify suspect phonetic units as either verified phonetic units or misaligned phonetic units. For instance, the alignment validation interface 150 can include multimedia components allowing suspect phonetic units to be audibly played so that a technician can determine the quality of the phonetic units. The alignment validation interface 150 can contain a validation object, such as a button, selectable by a technician. If the validation object is triggered, a suspect phonetic unit can be marked as verified and placed within the verified data store 135. The alignment validation interface 150 can also contain a denial object, such as a button, selectable by a technician. If the denial object is triggered, a suspect phonetic unit can be marked as rejected and placed within the misaligned data store 145. Phonetic units placed within the misaligned data store 145 can be excluded from CTTS voice builds. Further, the alignment validation interface 150 can include navigation buttons for navigating from one suspect phonetic unit to other suspect phonetic units.

The CTTS voice builder 155 can include hardware and/or software components configured to construct a CTTS voice from a plurality of verified phonetic units. Notably, a complete CTTS voice can typically require a complete set of phonetic units. Further, multiple choices for each necessary phonetic unit in the set comprising the CTTS voice can be included within the verified data store 135. The CTTS voice builder 155 can select a preferred set of phonetic units from a set of verified phonetic units disposed in the verified data store 135. Of course, a selection of a preferred set of phonetic units is unnecessary if all the phonetic units that have been verified are to be included within the CTTS voice.

As previously noted, system 100 can include the CTTS speech corpus data store 105, the unfiltered data store 115, the verified data store 135, the suspect data store 140, the misaligned data store 145, and the CTTS voice data store 160. A data store, such as data stores 105, 115, 135, 140, 145, and/or 160, can be any electronic storage space configured as an information repository. Each data store can represent any type of memory storage space, such as a space within a magnetic and/or optical fixed storage device, a space within a temporary memory location like random access memory (RAM), and a virtual storage space distributed across a network. Additionally, each data store can be logically and/or physically implemented as a single data store or as several data stores. Each data store can also be associated with information manipulation methods for performing data operations, such as storing data, querying data, updating data, and/or deleting data. Further, the data within the data stores can be stored in any fashion, such as within a database, within an indexed file or files, within non-indexed file or files, within a data heap, and the like.

In operation, sample speech segments can exist within the CTTS speech corpus data store 105. The automatic phonetic labeler 110 can generate phonetic units from the data in the CTTS speech corpus data store 105, placing the generated phonetic units within the unfiltered data store 115. The misalignment detector 120 can then compute an abnormality index for each phonetic unit contained in the unfiltered data store 115. If the computed abnormality index exceeds a normality threshold, the phonetic unit can be placed within the suspect data store 140. Otherwise, the phonetic unit can be placed within the verified data store 135. The alignment validation interface 150 can subsequently be used to examine the suspect phonetic units. If validated by the alignment validation interface 150, a suspect phonetic unit can be placed within the verified data store 135. If rejected, a suspect phonetic unit can be placed within the misaligned data store 145. Finally, the CTTS voice builder 155 can construct a CTTS voice from data within the verified data store 135 and place the CTTS voice within the CTTS voice data store 160.

One of ordinary skill in the art should appreciate that the above arrangement is just one exemplary arrangement for implementing the present invention and that other functionally equivalent arrangements can be utilized. For example, instead of placing suspect phonetic units, verified phonetic units, and rejected phonetic units within different data stores, each phonetic unit can be appropriately annotated and stored within a single data store. In another example, a single interface having the features attributed to both interface 125 and interface 150 can be implemented in lieu of interfaces 125 and 150.

Figure 2:
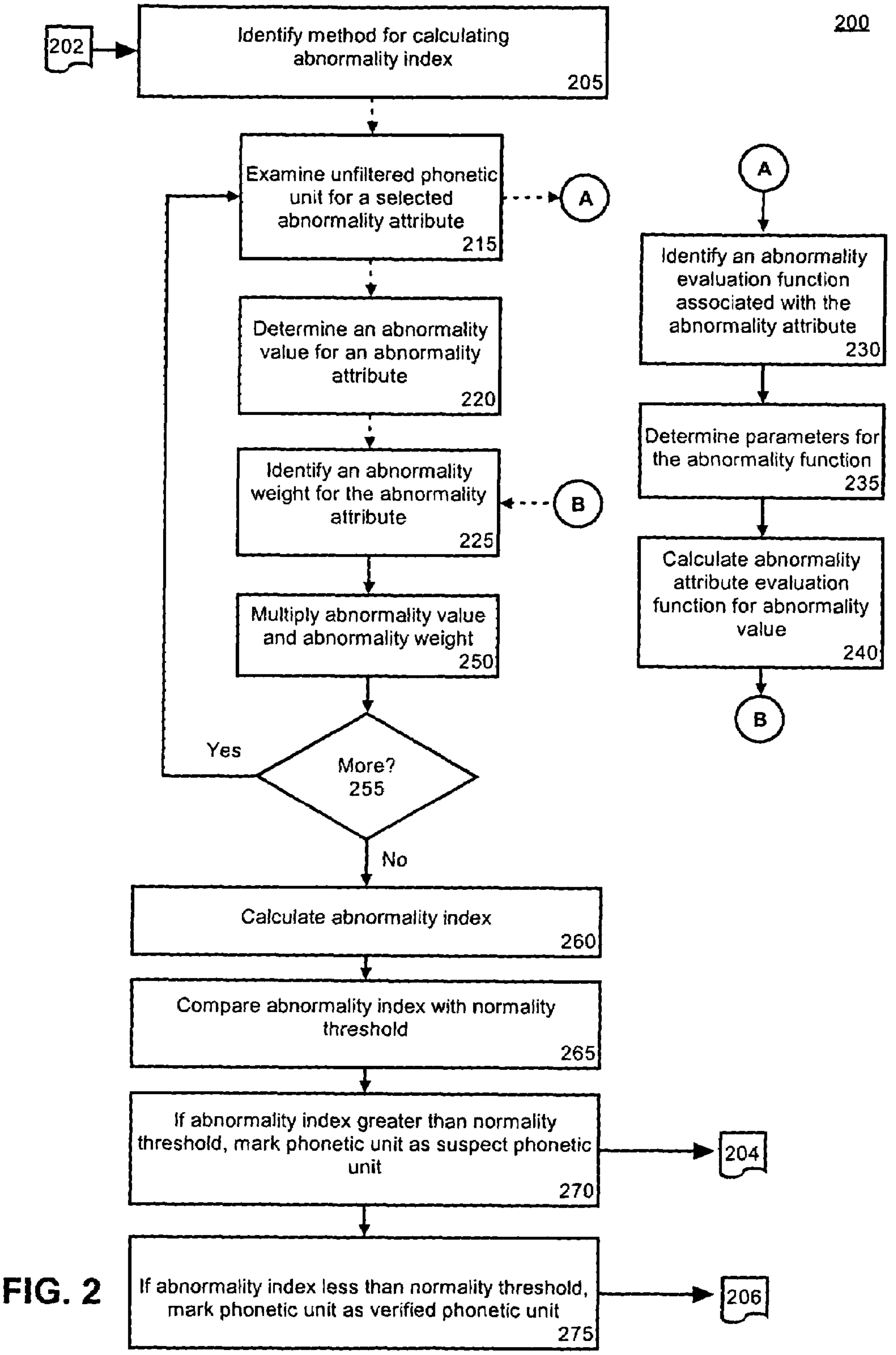
FIG. 2 is a flow chart illustrating a method of calculating an abnormality index for a phonetic unit using the system of FIG. 1.

FIG. 2 is a flow chart illustrating a method 200 of calculating an abnormality index for a phonetic unit. Method 200 can be performed within the context of a misalignment detection process that compares a confidence interval against a normality threshold. Accordingly, the method 200 can be performed within the misalignment detector 120 of FIG. 1. The method 200 can be initiated with the reception of a phonetic unit 202, which can be retrieved from an unfiltered phonetic unit data store. Once initiated, the method 200 can begin in step 205 where a method for calculating an abnormality index can be identified. For example, the identified method can calculate the abnormality index based upon the waveform of the phonetic unit as a whole. In another example, the identified method can be based upon discrete characteristics or abnormality attributes that can be contained within the phonetic unit.

In step 215, the unfiltered phonetic unit can be examined for a selected abnormality attribute. Abnormality attributes can refer to any of a variety of indicators that can be used to determine whether a phonetic unit has been misaligned. For example, the digital signal for the unfiltered phonetic unit can be normalized relative to the digital signal for the model phonetic unit and a degree of variance between the two digital signals can be determined. In another example, average pitch value, pitch variance, and phonetic unit duration can be abnormality attributes. Further, probabilistic functions typically used within speech technologies, such as the likelihood of the best path in the viterbi alignment, can be used to quantify abnormality attributes. In step 220, the appropriate abnormality index can be determined for the abnormality attribute. In making this determination, the abnormality attribute of the unfiltered phonetic unit can be compared to an expected value. The expected value can be based in part upon values for the abnormality attribute possessed by at least one phonetic unit, such as a model phonetic unit, equivalent to the unfiltered phonetic unit.

Alternatively, in step 230 an abnormality evaluation function associated with the abnormality attribute can be identified. Any of a variety of different evaluation functions normally used for digital signal processing and/or speech processing can be used. Additionally, the abnormality attribute evaluation function can be either algorithmically or heuristically based. Further, the evaluation function can be generic or specific to a particular phonetic type.

For example, different algorithmic evaluation functions can be used depending on whether phonetic unit of a phoneme is a plosive, such as the "p" in "pit," a diphthong, such as the "oi" in "boil," or a fricative, such as the "s" in "season." In another example, the abnormality attribute evaluation function can be a trained neural network, such as a speech recognition expert system.

Once the abnormality function is identified, the method can proceed to step 235 where the phonetic unit can be examined to determine parameter values for the identified abnormality function. In step 240, using the identified parameter values and the identified function an abnormality value can be calculated.

Once an abnormality value has been calculated, the method can proceed to step 225 where an abnormality weight for the abnormality attribute can be determined. In step 250, the abnormality weight can be multiplied by the abnormality value. The results of step 250 can be referred to as the abnormality factor of the phonetic unit for a particular abnormality attribute. In an embodiment including an abnormality attribute evaluation function, equation (1) can be used to calculate an abnormality factor.

$$\text{abnormality factor}=aw*af\,(ap1,ap2,\ldots,apn) \quad (1)$$

where aw is the abnormality weight, af is the abnormality attribute evaluation function, and ap1,ap2, . . . , apn are abnormality parameters for the abnormality attribute evaluation function. In another embodiment, equation (2) can be used to calculate an abnormality factor.

$$\text{abnormality factor}=aw*av \quad (2)$$

where aw is the abnormality weight and av is the abnormality value.

In step 255, the method can determine whether any additional abnormality attributes are to be examined. If so, the method can proceed to step 215. If not, the method can proceed to step 260 where an abnormality index can be calculated. For example, the abnormality index can be the summation of all abnormality factors calculated for a given phonetic unit.

Once the abnormality index has been calculated in step 260, the method can proceed to step 265 where the abnormality index can be compared with a normality threshold. In step 270, if the abnormality index is greater than the normality threshold, the phonetic unit can be marked as a suspect phonetic unit 204. In one embodiment, the suspect phonetic unit 204 can be conveyed to a suspect phonetic unit data store. If, however, the abnormality index is less than the normality threshold, as shown in step 275, then the phonetic unit can be marked as a verified phonetic unit 206. In one embodiment, the verified phonetic unit 206 can be conveyed to a verified data store.

Figure 3:
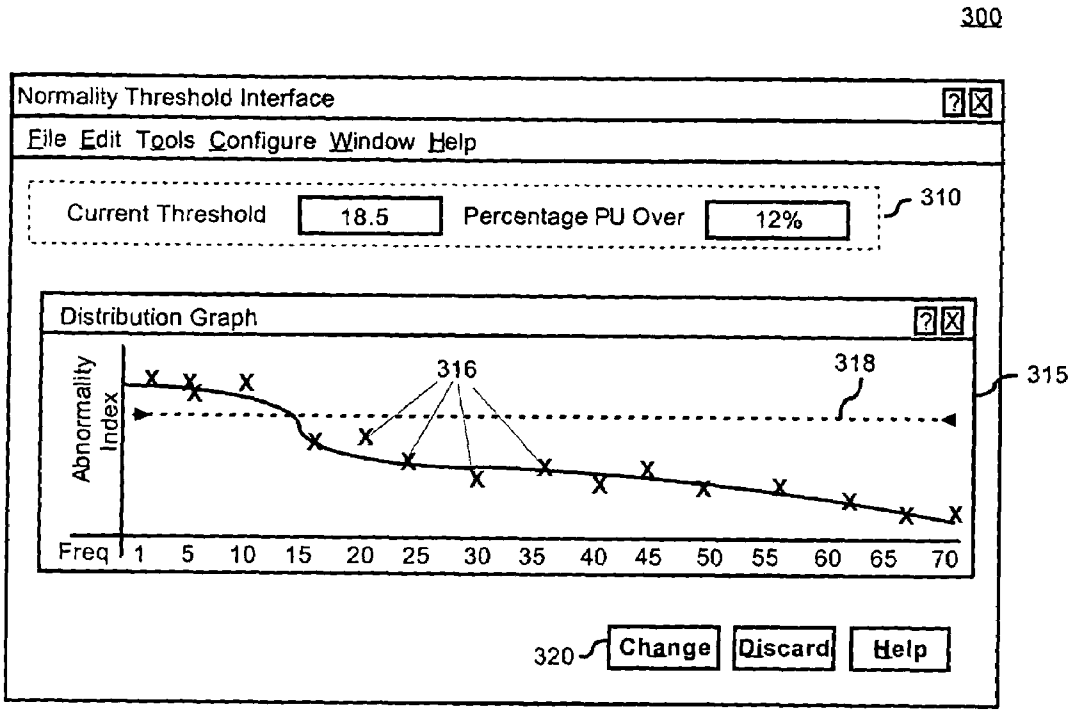
FIG. 3 is an exemplary graphical user interface (GUI) of a normality threshold interface shown in FIG. 1.

FIG. 3 is an exemplary GUI 300 of a normality threshold interface as described in FIG. 1. The GUI 300 can include a threshold establishment section 310, a distribution graph 315, and a threshold change button 320. The threshold establishment section 310 can allow a user to enter a new threshold value. For example, a threshold value can be entered into a text box associated with the current threshold. Alternately, a user can enter a percentage value in the threshold establishment section 310, wherein the percentage represents the percentage of phonetic units that have an abnormality index greater than the established normality threshold. If such a percentage is entered, a corresponding threshold value can be automatically calculated.

Figure 4:
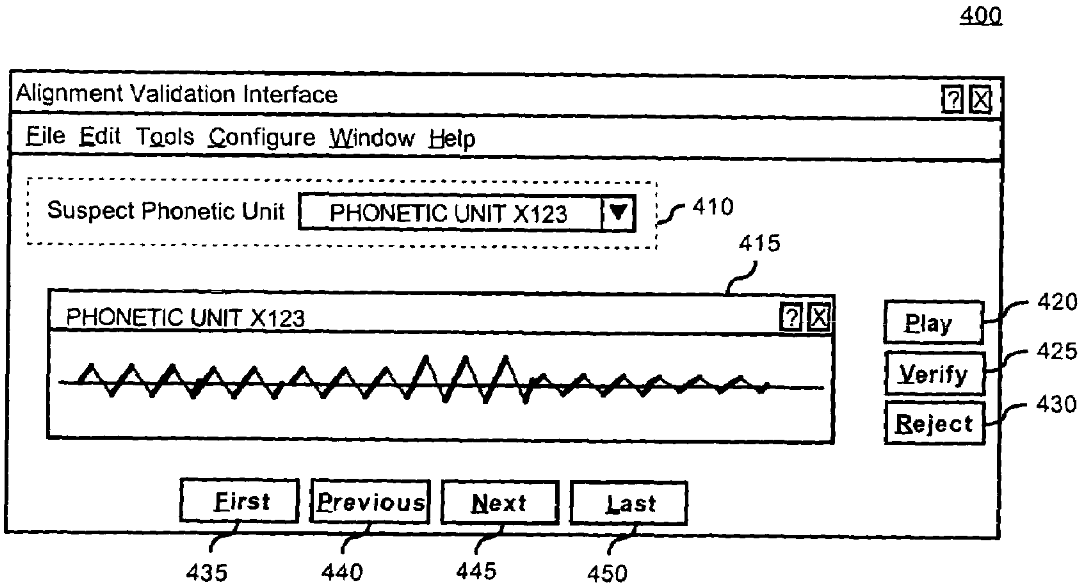
FIG. 4 is an exemplary GUI of an alignment validation interface shown in FIG. 1.

The distribution graph 315 can graphically present abnormality index values 316 for processed phonetic units with the ordinate measuring abnormality index and the abscissa specifying a frequency of phonetic units approximately having a specified abnormality index. Additionally, the distribution graph 315 can include a graphic threshold 318 pictorially illustrating the current normality threshold value. In one embodiment, the graphic threshold 318 can be interactively positioned resulting in corresponding changes automatically occurring within the threshold establishment section 310. Selection of the threshold change button 320 can cause the threshold value appearing within GUI 300 to become the new normality threshold value for the misalignment determination system. FIG. 4 is an exemplary GUI 400 of an alignment validation interface as described in FIG. 1. The GUI 400 can include a suspect unit item 410, a graphic unit display 415, a play button 420, a verify button 425, a reject button 430, and navigation buttons 435, 440, 445, and 450. The suspect unit item 410 can display an identifier for a phonetic unit currently contained within a suspect phonetic unit data store. The phonetic unit presented within the suspect unit item 410 changes responsive to navigation button selections. For example, if the first navigation button 435 is selected, an identifier for the first sequential suspect unit within the suspect data store can be presented in the suspect unit item 410. Similarly, the previous navigation button 440 can cause the immediately preceding suspect unit identifier to be presented in the suspect unit item 410. The next navigation button 445 can cause the immediately proceeding suspect unit identifier to be presented in the suspect unit item 410. Finally, the last navigation button 450 can cause the last sequential suspect unit identifier to be presented in the suspect unit item 410.

The graphic unit display 415 can graphically present a waveform including the suspect phonetic unit identified in the suspect unit item 410. In one arrangement, the phonetic units neighboring the suspect phonetic unit can also be graphically presented in order to give context to the suspect graphic unit. Controls can be included within the graphic unit display 415 to navigate from one displayed segment of the phonetic unit waveform to another. Additionally, selection of the play button 420 can cause the waveform presented within the graphic unit display 415 to be audibly presented. Selection of the verify button 425 can mark the current phonetic unit as a verified phonetic unit. Additionally, the verified phonetic unit can be moved from the suspect data store to the verified data store. Selection of the reject button 430 can mark the current phonetic unit as a rejected phonetic unit. Whenever the misalignment is due to a boundary being misplaced, selection of the reject button 430 can also cause the phonetic unit sharing the boundary with the suspect unit to be rejected. Additionally, the rejected phonetic unit can be moved from the suspect data store to the misaligned data store.

It should be noted that the various GUIs disclosed herein are shown for purposes of illustration only. Accordingly, the present invention is not limited by the particular GUI or data entry mechanisms contained within views of the GUI. Rather, those skilled in the art will recognize that any of a variety of different GUI types and arrangements of data entry, fields, selectors, and controls can be used.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of filtering phonetic units to be used within a concatenative text-to-speech voice, comprising the steps of:

receiving into a filtering system at least one phonetic unit that has been automatically extracted from a speech corpus in order to construct a concatenative text-to-speech voice;

calculating an abnormality index for said phonetic unit, wherein said abnormality index indicates a likelihood of said phonetic unit being misaligned;

comparing said abnormality index to a normality threshold;

if said abnormality index does not exceed said normality threshold, marking said phonetic unit as a verified phonetic unit; and, building said concatenative text-to-speech voice using said verified phonetic units.

2. The method of claim 1, further comprising the step of:

if said abnormality index exceeds said normality threshold, marking said phonetic unit as a suspect phonetic unit.

3. The method of claim 2, further comprising the step of presenting said suspect phonetic unit within an alignment validation interface, wherein said alignment validation interface comprises a validation means for validating said suspect phonetic unit and a denial means for invalidating said suspect phonetic unit.

4. The method of claim 3, wherein said at least one phonetic unit comprises a plurality of phonetic units, said method further comprising the steps of:

providing at least one navigation control within said alignment validation interface; and, upon a selection of one of said navigation controls, navigating from said suspect phonetic unit to a different suspect phonetic unit.

5. The method of claim 3, further comprising the steps of:

providing an audio playback control within said alignment validation interface; and, upon a selection of said audio playback control, audibly presenting said suspect phonetic unit.

6. The method of claim 3, further comprising the step of:

if said validation means is selected within said alignment validation interface, marking said suspect phonetic unit as a verified phonetic unit.

7. The method of claim 3, further comprising the steps of:

if said denial means is selected within said alignment validation interface, marking said suspect phonetic unit as a rejected phonetic unit; and, excluding said rejected phonetic units from said building of said concatenative text-to-speech voice.

8. The method of claim 1, wherein said at least one phonetic unit comprises a plurality of phonetic units, said method further comprising the steps of:

presenting a graphical distribution of the abnormality indexes of said plurality of phonetic units within a normality threshold interface; and, adjusting said normality threshold with said normality threshold interface.

9. The method of claim 1, said calculating step further comprising the steps of:

examining said phonetic unit for a plurality of abnormality attributes;

assigning an abnormality value for each of said abnormality attribute; and, calculating said abnormality index based at least in part upon said plurality of abnormality values.

10. The method of claim 9, said calculating step further comprising the steps of:

for each abnormality attribute, identifying an abnormality weight and multiplying said abnormality weight and said abnormality value; and, adding results from said multiplying to determine said abnormality index.

11. The method of claim 9, said assigning step further comprising the steps of:

examining said phonetic unit for at least one abnormality attribute characteristic;

for each abnormality attribute characteristic, determining at least one abnormality parameter;

utilizing said abnormality parameters within an abnormality attribute evaluation function; and, calculating said abnormality index using said abnormality attribute evaluation function.

12. A system of filtering phonetic units to be used within a concatenative text-to-speech voice, comprising:

means for receiving at least one phonetic unit that has been automatically extracted from a speech corpus in order to construct a concatenative text-to-speech voice;

means for calculating an abnormality index for said phonetic unit, wherein said abnormality index indicates a likelihood of said phonetic unit being misaligned;

means for comparing said abnormality index to a normality threshold;

means for marking said phonetic unit as a verified phonetic unit when said abnormality index does not exceed said normality threshold; and, means for building said concatenative text-to-speech voice using said verified phonetic units.

13. A computer-readable storage medium having stored thereon, a computer program having a plurality of code sections, said code sections executable by a computer for causing the computer to perform the steps of:

receiving into the computer at least one phonetic unit that has been automatically extracted from a speech corpus in order to construct a concatenative text-to-speech voice;

calculating an abnormality index for said phonetic unit, wherein said abnormality index indicates a likelihood of said phonetic unit being misaligned;

comparing said abnormality index to a normality threshold;

if said abnormality index does not exceed said normality threshold, marking said phonetic unit as a verified phonetic unit; and, building said concatenative text-to-speech voice using said verified phonetic units.

14. The computer-readable storage medium of claim 13, wherein the computer further performs the step of:

if said abnormality index exceeds said normality threshold, marking said phonetic unit as a suspect phonetic unit.

15. The computer-readable storage medium of claim 14, wherein the computer further performs the step of presenting said suspect phonetic unit within an alignment validation interface, wherein said alignment validation interface comprises a validation means for validating said suspect phonetic unit and a denial means for invalidating said suspect phonetic unit.

16. The computer-readable storage medium of claim 15, wherein said at least one phonetic unit comprises a plurality of phonetic units, the machine further performing the steps of:

providing at least one navigation control within said alignment validation interface; and, upon a selection of one of said navigation controls, navigating from said suspect phonetic unit to a different suspect phonetic unit.

17. The computer-readable storage medium of claim 15, wherein the computer further performs the steps of:

providing an audio playback control within said alignment validation interface; and, upon a selection of said audio playback control, audibly presenting said suspect phonetic unit.

18. The computer-readable storage medium of claim 15, wherein the computer further performs the step of:

if said validation means is selected within said alignment validation interface, marking said suspect phonetic unit as a verified phonetic unit.

19. The computer-readable storage medium of claim 15, wherein the computer further performs the steps of:

if said denial means is selected within said alignment validation interface, marking said suspect phonetic unit as a rejected phonetic unit; and, excluding said rejected phonetic units from said building of said concatenative text-to-speech voice.

20. The computer-readable storage medium of claim 13, wherein said at least one phonetic unit comprises a plurality of phonetic units, wherein the computer further performs the steps of:

presenting a graphical distribution of the abnormality indexes of said plurality of phonetic units within a normality threshold interface; and, adjusting said normality threshold with said normality threshold interface.

21. The machine-readable storage medium of claim 13, wherein said calculating step further comprises the steps of:

examining said phonetic unit for a plurality of abnormality attributes;

assigning an abnormality value for each of said abnormality attribute; and, calculating said abnormality index based at least in part upon said plurality of abnormality values.

22. The machine-readable storage medium of claim 21, wherein said calculating step further comprises the steps of:

for each abnormality attribute, identifying an abnormality weight and multiplying said abnormality weight and said abnormality value; and, adding results from said multiplying to determine said abnormality index.

23. The machine-readable storage medium of claim 21, wherein said assigning step further comprises the steps of:

examining said phonetic unit for at least one abnormality attribute characteristic;

for each abnormality attribute characteristic, determining at least one abnormality parameter;

utilizing said abnormality parameters within an abnormality attribute evaluation function; and, calculating said abnormality index using said abnormality attribute evaluation function.

* * * * *